(12) United States Patent
Latta

(10) Patent No.: US 7,698,147 B2
(45) Date of Patent: Apr. 13, 2010

(54) INFORMATION BASED NETWORK PROCESS FOR MAIL SORTING/DISTRIBUTION

(75) Inventor: John S. Latta, Arlington, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1296 days.

(21) Appl. No.: 10/457,178

(22) Filed: Jun. 9, 2003

(65) Prior Publication Data

US 2003/0200113 A1     Oct. 23, 2003

Related U.S. Application Data

(62) Division of application No. 09/668,598, filed on Sep. 22, 2000, now Pat. No. 6,674,038.

(51) Int. Cl.
*G06Q 10/00*     (2006.01)
(52) U.S. Cl. .......................................................... 705/1
(58) Field of Classification Search ........................ None
See application file for complete search history.

(56) References Cited

U.S. PATENT DOCUMENTS

| | | | |
|---|---|---|---|
| 4,632,252 A | 12/1986 | Haruki et al. | 209/546 |
| 5,051,914 A | 9/1991 | Sansone et al. | 700/223 |
| 5,060,165 A | 10/1991 | Schumacher et al. | 700/213 |
| 5,068,797 A * | 11/1991 | Sansone et al. | 700/219 |
| 5,072,401 A * | 12/1991 | Sansone et al. | 700/219 |
| 5,518,122 A | 5/1996 | Tilles et al. | 209/539 |
| 5,673,193 A | 9/1997 | Brust et al. | 705/406 |
| 5,703,783 A | 12/1997 | Allen et al. | 700/213 |
| 5,742,932 A | 4/1998 | Levitsky | 705/410 |
| 5,910,998 A | 6/1999 | Yui | 209/584 |
| 6,009,416 A * | 12/1999 | Pintsov | 705/410 |
| 2002/0059139 A1* | 5/2002 | Evans | 705/40 |

FOREIGN PATENT DOCUMENTS

EP     0 575 109 A1     12/1993

OTHER PUBLICATIONS

"Email Goes Postal." www.destop-computing.com/InternetNewletters/October2000News.htm, p. 3., Wall Street Journal, Monday, Jul. 31, 2000.*
"Email Goes Postal," www.desktop-computing.com/InternetNewletters/October2000News.htm, p. 3., Wall Street Journal, Monday, Jul. 31, 2000.

* cited by examiner

*Primary Examiner*—John W Hayes
*Assistant Examiner*—Rob Wu

(57) ABSTRACT

In a network-based mail processing system and method of the invention, the originating presort bureau or node is defined as the first bureau to receive and process mail, usually near the point of creation. Each presort bureau or node in the network is generally also a destination bureau or node since each processes mail from other nodes for delivery to recipients in its respective region by the postal regional sorting centers associated with its destination codes. Interactive network processing enables higher density of sorts at destination nodes and reduces overall sorts, postage, and sort costs over non-interactive processing centers. The term "presort bureau" is used to connote a service bureau or any other entity which is a) part of the enterprise network, b) processes mail created and entered by itself or by mailers it services, and/or c) processes mail interactively with other network nodes. A similar network is described for mail-like items.

14 Claims, 4 Drawing Sheets

INFORMATION BASED NETWORK PROCESS FOR MAIL SORTING/DISTRIBUTION

RELATED APPLICATION

This Application is a divisional of application Ser. No. 09/668,598, filed Sep. 22, 2000 now U.S. Pat. No. 6,674,038.

TECHNICAL FIELD

The present invention relates to mail sorting and distribution system and method and more particularly, to a system and method, for example, in the private sector, wherein bulk mailers and private mail service companies utilize a network system to increase handling and cost efficiency of mail processing.

BACKGROUND OF THE INVENTION

In certain industrialized and automated countries, mail processing is performed primarily by a federal or public mail processing entity, the entity often having a monopoly to collect, sort, transport, distribute, and deliver mail. This process is usually funded via collection of postage. In some countries, notably the United States, this process is augmented by work-sharing, wherein major mailers and/or service bureaus pre-process mail via computers or computer-based automation in order to facilitate efficient processing of mail. Work-sharing performed by major mailers, service bureaus, or other third parties, is known in the United States as presorting for discount. A postage discount is earned via preprocessing mail by performing a certain level of barcoding and sorting of the mail before entry into the public postal authority or postal service.

The requirements for worksharing can be met by data processing using mailing lists and/or databases at or prior to the point of mail creation, or by a combination of software driven systems and automation after mail creation. Both methods achieve the objective of applying a barcode which is standard within at least a national framework, and presorting at the point of origin or creation of the mail. In private, mail-like systems, such as private express carriers and courier services, an equivalent relationship exists between customers or mailers and service providers through contracts or rule-based processes in which savings are achieved in "mailing" or shipping costs when the customer (1) uses standard labels/manifests and organizes the shipment according to weight, volume and type; (2) meets certain volume requirements; and/or (3) uses certain pickup or deposit points to facilitate the physical entry of the items into the service system at the point of origin. As will be seen, such practices are relevant since the present invention can be applied to postal systems, whether public or private, and to competing private networks to good effect.

Presorting operations are typically located in major metropolitan areas where mail is created and entry into the postal service is done locally. Where a company owns more than one service bureau in separate geographical locations, the current operating process is substantially the same as if the bureaus were independently owned. Presorting cooperatively with the federal post is relatively efficient as a result of post-driven standardization of addressing, machine readable codes, and rules for sorting to levels compatible with the delivery system used by the federal post, particularly in the United States and Europe.

Efficiency includes at least the ability to (1) sort and code mail with a high piece rate/man-hour by automation and (2) achieve predictability of arrival at the destination address as measured from the time of entry into presort bureaus or into federal post processing centers. Predictable arrival time is important for mail with a time dependent marketing message, allowing businesses to coordinate fulfillment and product distribution processes in order to maximize sales, service, and customer satisfaction, or for financial transactions, such as billing or payment events.

Available data demonstrate that preprocessing of mail is cost-effective for all involved since cost avoidance by the federal post is greater than discounts available and/or permitted by regulation or postal rates approved by rate making authorities. At the same time, the discounted cost of postage represents a savings to mailers and is sufficient to compensate for value-added processes contributed by presort functions.

Greater efficiency can be obtained, however, by 1) further improving productivity of the overall presort function on a network basis, 2) information exchange between presorters or cooperative major mailers, and 3) improving predictability of delivery by process changes that permit entry of presorted mail into the federal post at destination points closest to the destination address. The present invention describes the physical processes, information processes, and financial arrangements which make possible improvements in both productivity and predictability. The new processes described should be of interest to mailers whose communications are time dependent and for whom the separation of such mail from general collection mail, which may not be so time dependent, inherently provides for expedited and efficient processing and delivery of mail, whether or not processing is done within or external to the federal post. Similarly, productivity and service enhancements will be attractive to bureau operators in view of competitive advantages of network members over non-networked operations. In some cases, economic gain from efficiencies inherent in the new network process will be enhanced through changes in rates designed as incentives to reward the new value created by the process.

Current public and private network process methods employ exception item processing for reading addresses and obtaining appropriate bar codes in cases where automation-based optical reading technology is used to accomplish address reading in real-time machine processing. Semiautomatic methods include on-premises and remote encoding methods, both of which use image-lift data captured during automated processing. Image data is identified via an identification (ID) number, which is printed on the individual mail piece and is later used to match exception item coding results with the physical mail piece/item. In remote encoding cases, images are transferred from a particular process node to a remote site(s) where computer databases and keyboard CRT stations enable operators to enter otherwise unreadable information to obtain desired bar code information. This information is then relayed back to the original presort center (process node) where, in a subsequent process, bar code information is printed on the appropriate mail piece/item using an ID number as a matching device. This process will change under information based network processing systems as a result of the changes inherent in the new physical process method.

SUMMARY OF THE INVENTION

In the network based mail processing system and method of the invention, the originating presort bureau or node is defined as the first bureau to receive and process mail, usually near the point of creation. In the following, the term presort bureau is used to connote a service bureau or any other entity which is a) part of the enterprise network, b) processes mail created and entered by itself or by mailers it services, and/or c) processes mail interactively with other network nodes. As such, for purposes of simplicity in this description, the term presort bureau includes, for example, a private mailer whose originating mail may be entered by itself into the network. It may also enter mail/item volumes processed under agreements with other mailers not otherwise involved in the network process.

Further, the term presort bureau or node includes entities which create, manage, communicate and process hybrid mail. Hybrid mail occurs when data is created at one or more points of origin, sorted in data form, and transmitted through shipment of data media, such as CDs, DVDs, or data tapes, or via standard communications or satellite networks in data blocks or packets to destination points, where it is converted into physical mail or mail-like items and sorted or merged with other mail for delivery or for entry into destinating end process centers for delivery. Clearly, hybrid mail or hybrid mail-like items have both data message and physical message character. For purposes of the present invention, "mail items" refers to physical or hybrid mail pieces such as letters, flats and packages, and the foregoing mail-like items.

This originating end presorting bureau performs two major physical processes. First, it processes mailings and, using standard sorting schemes, separates national distribution components from local distribution components. This process differs from current practice in the makeup of the separation of the national distribution expressed in terms of sort scheme structure as follows. The national distribution is changed and simplified by sorting the national distribution component into batches that correspond to a finite number of destination processing centers which may be other presort bureaus whether affiliated or independent, as well as certain cooperating major mailers who barcode and/or presort mail. Hence, the national distribution scheme composition or makeup will not be defined by a subset of the zip code, such as the first three digits, for example, which is common in previous processing methods, but rather by the architecture of the network of cooperating presort bureau entities.

Although creation of batches of mail wherein each mail piece is sorted to three or preferably five common zip code digits at the originating end is the basis for postal discounts, it is contemplated according to the invention that each destination presort bureau or processing center would have an associated predetermined set of destination codes such as zip codes, and that transfers from other centers would be used to concentrate larger numbers of mail pieces having those codes at that center. This results in more batches which qualify for maximum cost savings and this reduces postal costs as compared to entering the mail pieces in an unsorted condition at the originating federal postal processing center. More importantly, it also results in substantial savings on postage as compared to the batches that could be obtained with each processing center operating independently with the mail it receives directly from originators. According to a preferred form of the invention, in order to minimize transportation costs, each destination presort bureau or processing center is also physically proximate to (in the same region as) the federal postal processing center to which mail having that predetermined set of destination codes would be sent for distribution to local post offices within the federal postal system. In terms of regions, each destination presort bureau or processing center is preferably in a region that includes the destinations identified by most or all of the predetermined set of destination codes.

Each originating presort bureau node or processing center, with few exceptions, also has a role as a destination node for the network using separate sort schemes for local distribution. Local distribution sort schemes will be substantially similar to prior art sort schemes, except, as will be seen subsequently, that the schemes will be processing larger volumes of destination mail. These larger volumes result from the modified process by which distribution for destination end entry is performed by each participating bureau (or cooperating presorting mailer) for all the other bureaus involved in this new networked facility processing method. From an automation standpoint, the new process reduces the number of national sortations required by any one participating presort entity and increases the density of mail volume in the remaining sortation schemes for destination or local distribution processing. It may increase the number of destination sorts.

In cases where a particular mailing has solely local distribution addresses, the difference between the process of the invention and current processing is minimal, except that efficiencies are still possible because inbound mail from other presorting entities will be combined with the subject mailing to achieve higher performance per man-hour and per capital equipment resource used. Additional efficiency can be obtained by scheduling the timing of national and local distribution processing steps in accordance with information available from the parallel information network next described.

In prior art practice, mail is metered with a date representing the day of entry into the federal post. The date is important as the difference between the entry date and the delivery date measures transit time and time-service quality. In a further aspect of the new network process of the invention, two entry dates are used. The first date is the date of entry into the private process network; the second date is the date of entry into the federal post. Both dates, combined with the delivery date to the addressee, enable measurement of time-service performance of the network, the federal post, or both. The objective of network time-service performance is to provide mailer/customers a transit time from network entry date to delivery date, which is less than the transit time from federal post entry date to delivery date for a non-network mail piece mailed between the same origin/destination points as the network mail piece. Network time-service performance can generally be better (shorter) than time-service performance of non-network mail pieces since the network provides custom handling, optimization benefits, and destination entry, all of which produce transmit/process times lower than those experienced by mail pieces entering the federal post at the origin end.

Permit mail may be accounted for at the originating end. Processing may be done with all permit mail entered at the originating end processing and distribution center ("P&DC") of the federal postal service as at present. Optionally, the permit mail can be treated like other mail and separated into local and national distribution components. The national distribution components will be processed at the destinating end to achieve maximum presort discounts. The allocation of discounts on permit mail to the mailer, originating presorter, and destinating presorter will be managed by a financial clearing office ("FCO") under the network cooperating agreement. The method of allocation will be subject to federal post review to ensure that 1) permit postage revenue is protected, 2) discounts are earned, and 3) mailers' interests are protected.

An information process useful for implementation of the physical processes described above is as follows. A data network linking cooperating bureaus makes possible exchange of data relating to arrival times of entry mailings, content of said mailing volumes and destination subsets, and projected time of departure and/or arrival of said mailings at other network processing centers. Data parameters can be used such as statistics of address makeup, including distinction of machine unreadable handwritten mail from machine printed mail, and characteristics of each in terms of font, style, contrast, background reflectance, as well as information content of addresses. Linkage between data in the information network and the physical mailing is established by definition of physical batches with attendant labeling, which labels are affixed to containers and/or sub-containers, such as trays or cartridges.

At a specified point in the physical processing of entry mail, the local originating node process computer builds a data file with a standard format of the content of mail batch (es) processed during the predetermined period. This data file will be further divided into sub-files for transmission to each processing center node in the physical network. It can be seen that sub-files arriving at a processing center from other preprocessing centers in a given period will be accumulated for data processing by the receiving center in advance of mail batch arrival, so as to establish dynamic sort plans for handling mail batch(es) when they arrive. Statistical estimation models can establish the expected arrival time of various batch(es) so that local processing operations can be optimized to predicted arrival times. Utility of these statistical estimations is enhanced since their nature is identical for every processing center, the only differences being in data content and variations resulting from the random makeup of mail arrivals from other cooperating presort centers.

In one embodiment, the financial process implemented in connection with the system and method of the invention is centralized at a common data processing location for the cooperating presort processing centers, or may be de-centralized by replication and distribution at each presort centers (process nodes). The financial process determines, through modeling algorithms, the value-added by each process center in terms of volumes processed at national distribution and local distribution levels. It distributes payment for that value-added in proportion to the total value-added of the network group. Underlying the financial process is the concept that a normalized value-added calculation can be used as a basis for compensation of each party out of payments received for processing. Put another way, the payment system rewards productivity resulting from differences in efficiency and the attendant process cost content stemming from network and discrete node process optimization, differences in performance levels of automation and process management, and worker performance. Payment is based on mutually agreed benchmarks for value-added from a given level of sortation, transportation, and volume processed. Bureaus operating above the "benchmark" will tend to have higher margins than bureaus performing below the benchmark. It will be understood, however, that the financial system and process according to the invention is a method of allocating costs among the network participants and preferably does not interfere with the relationship between each presort center and its mailer customers.

The network managed process of the invention can also improve product and material distribution networks whose function is to manage items originating in factories and destinating in retail outlets or other factories. The environment includes at least the current system for discounts available for preprocessing and destination entry of mail pieces. It may also include processing of mail-like items where the process can be applied to private express carriers with distribution, fulfillment, and delivery systems. In federal postal mail processing, discount systems for preprocessing services is well defined by the Domestic Mail Manual and regulations promulgated by the postal service as permitted under the statutes and with an established rate making authority. The invented processes do not eliminate current private processing operations, but rather improve current functionality by inherent advantages of new processes described herein. It will be clear that network processing optimization described in the context of present private processing centers applies to public or federal post networks as well.

Physical process network items, described in the following for clarity as mail items, are delivered to an initial processing point that could, for example, be a local presort bureau nearest to the point of mail creation. In general, the mail will have two components, a national distribution set of delivery points and a local distribution set. These components are somewhat variable in definition, but generally, local distribution is defined as the set of delivery points serviced by the local federal post process and distribution center (P&DC) and its allied delivery units. The national distribution is therefore all other delivery points serviced by other P&DC's and their subordinate offices, such as associate area distribution centers (AADC's). This process applies to all mail or mail-like items, and also applies where a separate processing or distribution network has been established for flats and parcels. "Mail-like" items are understood to mean items handled by private networks and distribution systems, such as those managed by Federal Express, DHL, UPS, and others.

Thus, in one embodiment, the invention includes a method of distributing mail-like items comprising the steps of: collecting mail-like items at one of a plurality of regional processing nodes, each of the regional processing nodes corresponding to one of a plurality of J geographical regions; sorting the mail-like items by destination for distribution within the region corresponding to the regional processing node in a preliminary sort; sorting the mail-like items for distribution to each of the other J-1 processing nodes associated with a geographical region corresponding to destination of each mail-like item; forwarding mail-like items destined for delivery in each of the plurality of regions to the respective regional processing node; receiving mail-like items from each of the other J-1 regional nodes designated for distribution within geographic region corresponding to the regional processing node; and forwarding mail-like items destined for delivery within the region corresponding to the regional processing node to a local distribution service.

In another aspect, the invention provides a method for distributing mail items, which mail items are created by a number of originators such as bulk mailers or letter shops for delivery to a number of recipients having different addresses through a postal service. The postal service, such as the U.S. Postal Service, has a set of postal regional sorting centers such as P&DC's having an associated set of postal regions. The postal regional sorting centers sort incoming mail pieces which are then transported to local post offices within the associated postal region for delivery to the recipients. The method includes the steps of:

(a) receiving mail items from an originator at one of a plurality of private processing centers each having an associated set of one or more postal destination codes, wherein "private" refers to a processing center that is not part of the federal postal system;

(b) sorting the received mail items into groups by the sets of destination codes;

(c) transferring each group of mail items having a destination code different from one of those associated with the receiving processing center to the corresponding destinating private processing center;

(d) at each processing center, converting any mail items in data form transferred in step (c) and any mail items in data form having a destination code which corresponds to one of those associated with the destinating (receiving) processing center into mail pieces;

(e) at each processing center, sorting mail pieces from steps (c) and (d) together with any mail pieces received directly from originators having a destination code which corresponds to one of those associated with the receiving processing center into batches effective to reduce processing costs as compared to mailing the same mail pieces with the postal service in an originating entry unsorted condition and without mail pieces received from other processing centers; and (f) delivering the batches to one or more of the postal regional sorting centers for delivery to the recipients.

"Processing costs" as referred to in step (e) includes total postage and also labor and other costs of handling the mail pieces, often expressed in dollars per thousand mailpieces. According to a further aspect of such a method, processing costs are reduced and at the same time process productivity is increased. The latter can be measured as the number of mail pieces processed per unit time, such as per hour or per day.

Since one or more embodiments of the invention changes the working relationships between the local private processing centers and the federal post, it is understood and expected that the deadlines or cutoff times for entry of worksharing volumes into the postal service will of necessity be modified from present practice in order to effect service quality improvements and benefits to mailers and the public in general. Such deadlines include, for example, the time of day that presorted, predated batches of mail must be received in order to qualify for a volume discount. Transportation or other service discounts may be added or changed in order to encourage capital investment in the improved processes, methods and systems described by the present invention. Such changes have been made by the U.S. Postal Service and other forward-looking posts in the public interest and to sustain postal services as a vibrant, viable alternative communications medium.

According to a further aspect of this embodiment, each processing center has an associated data center that preferably communicates via a network such as the Internet with the other data centers, preferably by means of a central process data center that assimilates data from all data centers. Data concerning volumes of mail items to be transferred to other processing centers is transmitted from the data center of each processing center to the central process data center, which then calculates for each processing center, using the transmitted data, the total volumes of mail items to be transferred from other processing centers to that processing center. The central process data center then transmits to each processing data center data concerning volumes of mail items to be transferred from other processing centers to that processing center. These steps are repeated periodically (individual updates from data centers may be received intermittently). Each data center can then use the information received to estimate arrival times for mail items to be transferred to the processing center for that data center.

Another aspect of the invention is the extension of the present item ID number to include additional data elements such as postal class and type which, together or separately, allow either the private network system or federal post, for example, to track or trace the item, modify processing of the item(s), select or outsort the item(s) as desired during its transit through the federal or private network(s), and analyze effects of process methods, whether network based or localized, on particular mail or mail-like items on certain categories of such items. For example, tracking of categories such as registered, certified, "special handling," priority, standard, first class, handwritten envelope, paper color, parcel, letter, flat, metered, permit, and international mial will be possible to a greater extent than at present. Such a result is achieved by extension of the ID number data elements and by processing such data in both real time and off-line contexts within the information network process described herein.

The invention further provides a method and system for allocation of cost savings for members of a network of processing centers such as the ones described above, which network generates a net savings in processing costs by transferring items between network processing centers prior to delivery to a final destination. Such a method includes the steps of:

(a) determining a value of labor performed by each processing center in processing of items received from or sent to other processing centers;

(b) determining a value of costs incurred by each processing center in processing of items received from or sent to other processing centers;

(c) determining a value of cost savings generated by each processing center by comparing an actual cost to a benchmark; and (d) making balancing payments between entities controlling the processing centers based on a net of the values determined in (a), (b) and (c). The benchmark may be an estimated cost calculated based upon an assumption that the network did not exist. In a preferred embodiment, a financial clearinghouse entity receives deposit payments from entities controlling the processing centers and makes the payments of step (d) by making transfers between deposit accounts.

The present invention further contemplates systems for carrying out the foregoing processes as described in the detailed description and claims below.

BRIEF DESCRIPTION OF THE DRAWINGS

For a more complete understanding of the features and advantages of the invention, reference is now make to the detailed description of the invention along with the accompanying figures in which corresponding numerals in the different figures refer to corresponding parts and in which.

DETAILED DESCRIPTION OF THE INVENTION (I) Physical Network Process.

Figure 1:
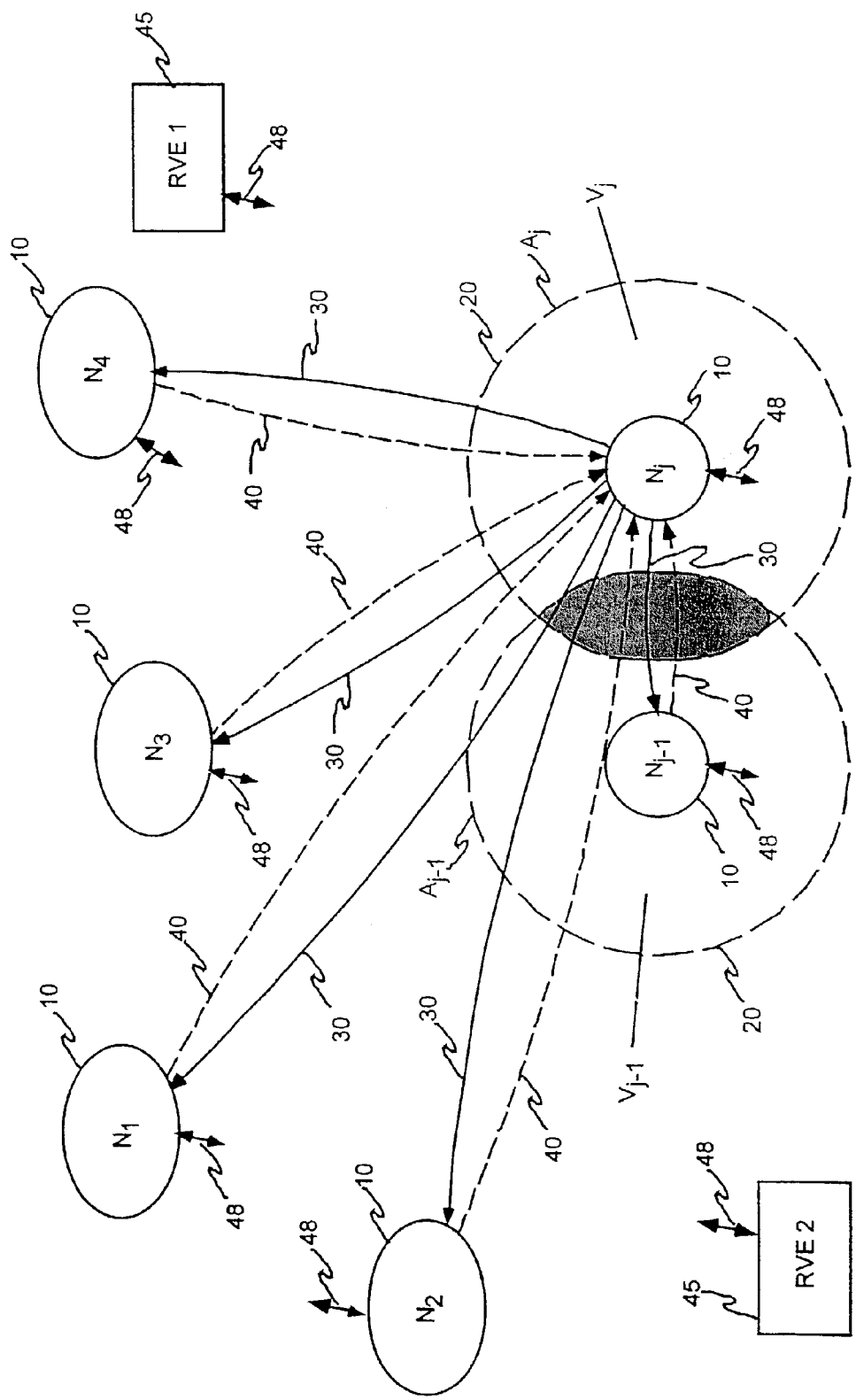
FIG. 1 is a schematic representation of the network physical process of the invention.

FIG. 1 represents the physical network of item processing centers and the flow of volumes between them. The physical process network consists of J processing nodes 10, each of which accept mail from customers. Each processing node 10 has a commitment to sort and bar code mail for its customers to reduce postage costs under a discount structure. Each process node 10 may participates in the savings by retaining a portion of the discount under a pricing structure. The network is designed as a cooperative network in which each processing node 10 minimizes cost of service by a) exchanging a priori and real time information with each other, b) making J-1 sorts and up to J-1 shipments 30 of mail to other nodes 10 for final local distribution sorting, and c) accepting up to J-1 shipments 40 for final sorting to its own local destinations in its local area Aj 20. Mail which is not local and not serviced by network process nodes 10 is sorted at least to the appropriate P&DC via the three-digit code for that P&DC. With sufficient cooperating process nodes, the originating-end sort to three-digit P&DCs can be minimized. In theory, if no nodes cooperate, the network is non-existent and the process becomes identical to the art practiced prior to the invention.

The following relationships illustrate flows, sorting levels and workload distribution in connection with the system and method of the invention:

Vpj=Primary sort volume distribution of items originating at node j, Nj.

i=The index number identifying the component volume at node j which is to be sorted and forwarded to node i in the multi node network of distribution centers.

Hence $$Vpj = \sum_{i=1}^{J} Vpji$$

which is sorted and forwarded to node i=1, 2, . . . J, where Vpj1=primary component at node Nj which is sorted and forwarded to node 1, N1, and Vpjj=turnaround volume at node Nj, i.e, Vpjj is the component of the originating volumes, Vpj which is segregated on the primary sort and held for secondary sorts (sort schemes) for local delivery. In private or commercial mail presort operations, these volumes are entered into the local federal postal distribution center known circa 2000 in the United States as the Processing and Distribution Center ("P&DC").

Thus, the general node, Nj, in a private network consisting of J nodes completes a primary sort of items originating in its local service area, "the primary sort pass". Clearly there can be multiple primary sort passes if originating batches or mailings arrive at intervals during the process day. If Vdj=the destinating volume to be sorted at node j, Nj, for local entry, then:

$$Vdj = \sum_{i=1}^{J} Vnij$$

where Vnij is the national distribution volume component sorted at node i, Ni, for node Nj, and J is the number of nodes in the network.

Note that some of the destinating components from node i, $1 \leq i \leq J$, do not arrive in the same time frame as Vnjj, the local turnaround mail on a given day. This means that in some cases the local turnaround mail will be combined with mail sorted one or more days previously at node i, Ni. The added volumes for local distribution at each processing node in the network process enterprise permit greater depth of sort than previously possible.

Exception item processing may be understood by reference to FIG. 1, which depicts one or more Remote Video Encoding ("RVE") sites 45, which are linked by a communications channel 48 to each of the processing nodes 10. Conventional communications technology permits communication between any node 10 and one or more remote sites 45. This architecture provides a primary remote video encoding service for selected processing nodes 10 and a secondary process node 45 available for backup processing. The RVE centers 45 may also be located for effective channel use between centers 45 and selected subset nodes 10 of the processing network universe.

In the process of the invention, for exception item processing in the information based network environment, images are transmitted from any originating node 10 to the appropriate RVE center 45. This image lift and image transmission event occurs when automated optical character recognition systems are unable to resolve the address of a particular mail piece/item. As described previously, subject items are marked with an ID number and isolated for subsequent processing. In the network process system described herein, mail piece identification will be unique within the processing network, enabling each mail piece/item to be processed wherever the final physical processing is done with correct bar code information from remote video sites 45. Completely unreadable mail pieces will be isolated with similar items at the originating node 10 and the remote video site will communicate correct information via channels 48 to that site. In cases where the mail piece was readable to at least three digits of the 5-digit Zip Code, the mail piece/items with ID number affixed can be transported with other mail piece/items to the destination nodes 10.

When this mail piece ID number is detected and read at the destinating end nodes 10 and no standard barcode is detected on the front of the item, a bar code is printed in real time and the mail piece/item is sorted using information transmitted from remote video encoding sites 45 sent via channels 48 and stored in a look-up file database in advance of arrival of the mail piece/item. This destination end exception item completion functionality provides additional processing time for such items, since the remote video encoding process is performed concurrent with primary sorting and transportation of physical mail pieces. This process method has the advantage over prior art where exception items processing is often truncated at the originating end because sufficient processing time is not available at the originating node 10 before cutoff deadlines for delivery of physical mail pieces to the local P&DC occur. The process described here for exception item processing requires no technology advances over existing computer and software systems beyond process related changes to accomplish the functional advantages of the network based processing system. The ID number is recognized as a reference escort code. Conflicts may exist between this ID number and, for example, the data content of the existing federal post ID number. If so, the ID number required for network processes described herein is printed in a different location on the item.

Figure 2:
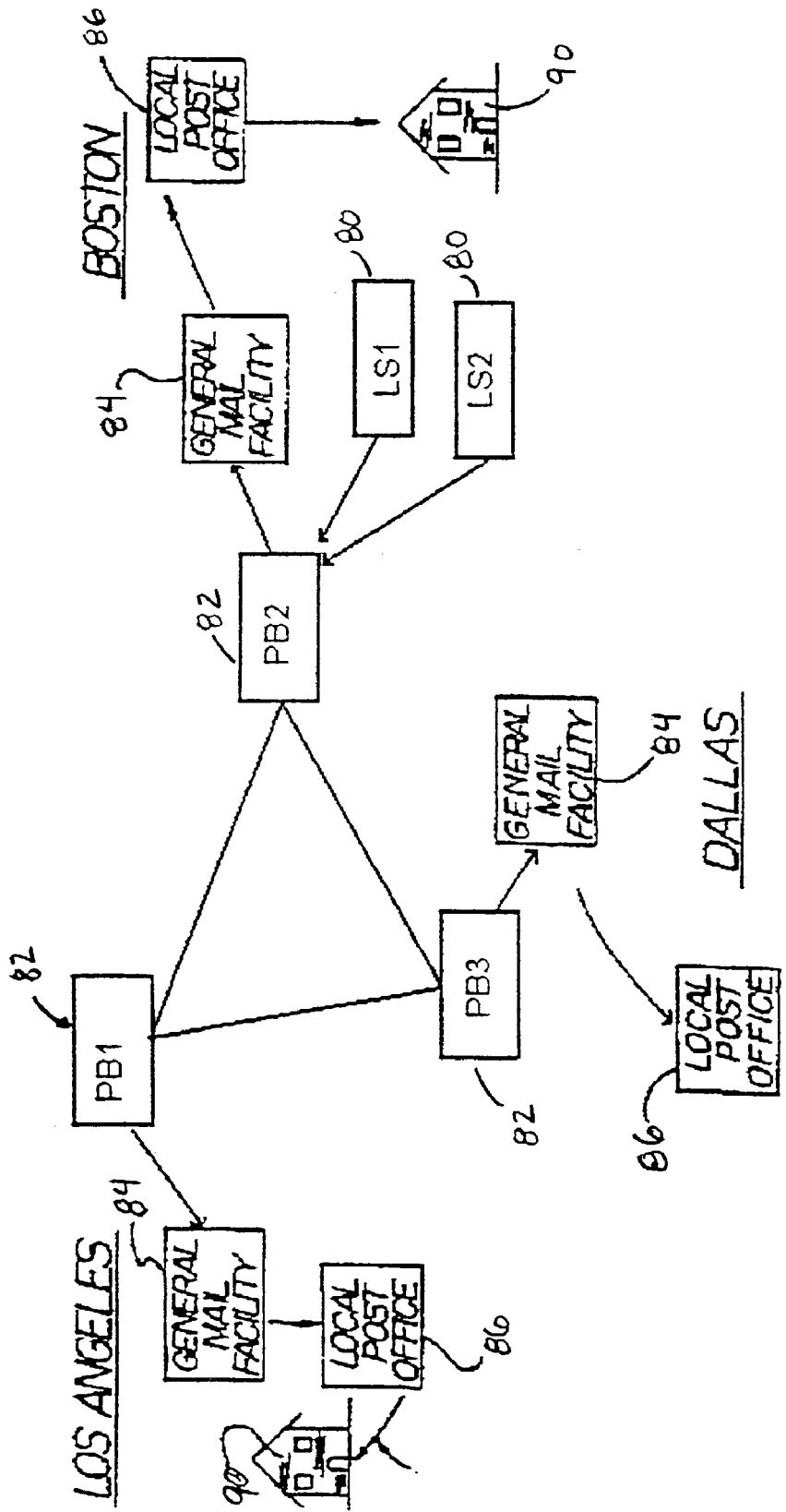
FIG. 2 is a schematic representation of the system and process of the present invention for mail sorting.

FIG. 2 illustrates a system for distributing mail pieces of the present invention. The system has two or more private processing centers 82 supporting various postal regions throughout a postal area, such as the United States. Each private processing center 82 has one or more associated sets of postal destination codes. The private processing centers 82 sort the mail received into groups by the sets of postal destination codes. One or more federal postal regional sorting centers 84, known as general mail facilities (GMF) or Process and Distribution Centers (P&DC) distribute mail received to local post offices 86. The local post offices 86, in turn, distribute the mail to the intended recipients 90. When mail is received by a processing center from one or more originators 80, such as bulk mailers or letter shops, the receiving processing center 82 sorts the mail into groups based upon destination codes. If the destination code of a group of mail is different from the destination codes associated with the receiving processing center, that group of mail is transferred to the processing center associated with those destination codes. As shown, it is preferred that each center 82 be geographically near to the federal sorting center 84 that distributes mail to the destination codes associated with nearby center 82.

At each processing center 82, hybrid mail received in data form is converted into mail pieces. Once all data form mail is converted, the mail pieces are sorted into batches, unless the data form mail is of sufficient volume alone or when merged with other data form mail to merit a computer based sort prior to physical mail creation. By sorting the mail into batches, the effective processing costs are reduced. Additionally, the total postage is reduced as compared to the postage for mailing the same mail pieces with a postal service in an originating entry unsorted condition. After sorting the mail into batches, at the processing centers, the batches are then transferred to the appropriate postal regional sorting centers. The postal regional sorting centers will, in turn, deliver the mail to local post offices where the mail will be delivered to the intended recipient. If there are no hybrid mail pieces to be converted from data form to mail pieces, then none are required to be sorted at the receiving processing center.

The sets of destination codes will depend on the number and location of the private network processing centers, and may or may not be determined by all taking zip codes in a selected geographic region. For example, a processing center located in Chicago might have as its set of destination codes all zip codes applicable to the states of Illinois, Indiana and Wisconsin. Such a processing center is private, that is, separate from the postal service or private carrier that will ultimately receive and deliver the mail pieces.

In this embodiment, at least a majority (i.e., 51-100%) of the destination codes are unique to only one processing center. Thus, all mail deposited at any processing center destined for a Wisconsin zip code in the preceding example will be sent to the Chicago processing center.

However, a certain amount of set overlap may be permissible or even desirable, if one processing center in the region does not have enough capacity to service all of the mail items transferred from other centers. The decision to which processing center 82 to transfer mail items could then be elective (at the discretion of the transferor) or preferably determined by other criteria applied by the networked information/control system described hereafter, such as backlog at each of the possible centers that receive mail for that zip code, or apportioned based on the capacity of each center with overlapping code sets.

It is preferable to deliver the batches from each processing center 82 to the nearest postal regional sorting center 84. Most likely, a majority of all the destination codes will be assigned to processing centers located in the postal region in which recipient addresses having such destination codes are located. It is further desired to deliver the batches from each processing center to the postal regional sorting center in the same postal region as the processing center.

Each processing center receives the majority of its mail items from originators located within an associated collection and distribution region in which that processing center is located. Such a collection and distribution region may be the same as or different from one of the postal regions.

Assuming the processing centers 82 are owned by a number of different entities, compensation based on total costs saved by the system and method described above may be distributed according to a predetermined apportionment method, to controlling entities of the processing centers as discussed further below, with the possibility of offsets or "balance payments" for costs incurred, e.g., the cost of trucking mail pieces from one processing center to another or volume related workload differences in final sorting operations.

(II) Information Network Process.

Figure 3:
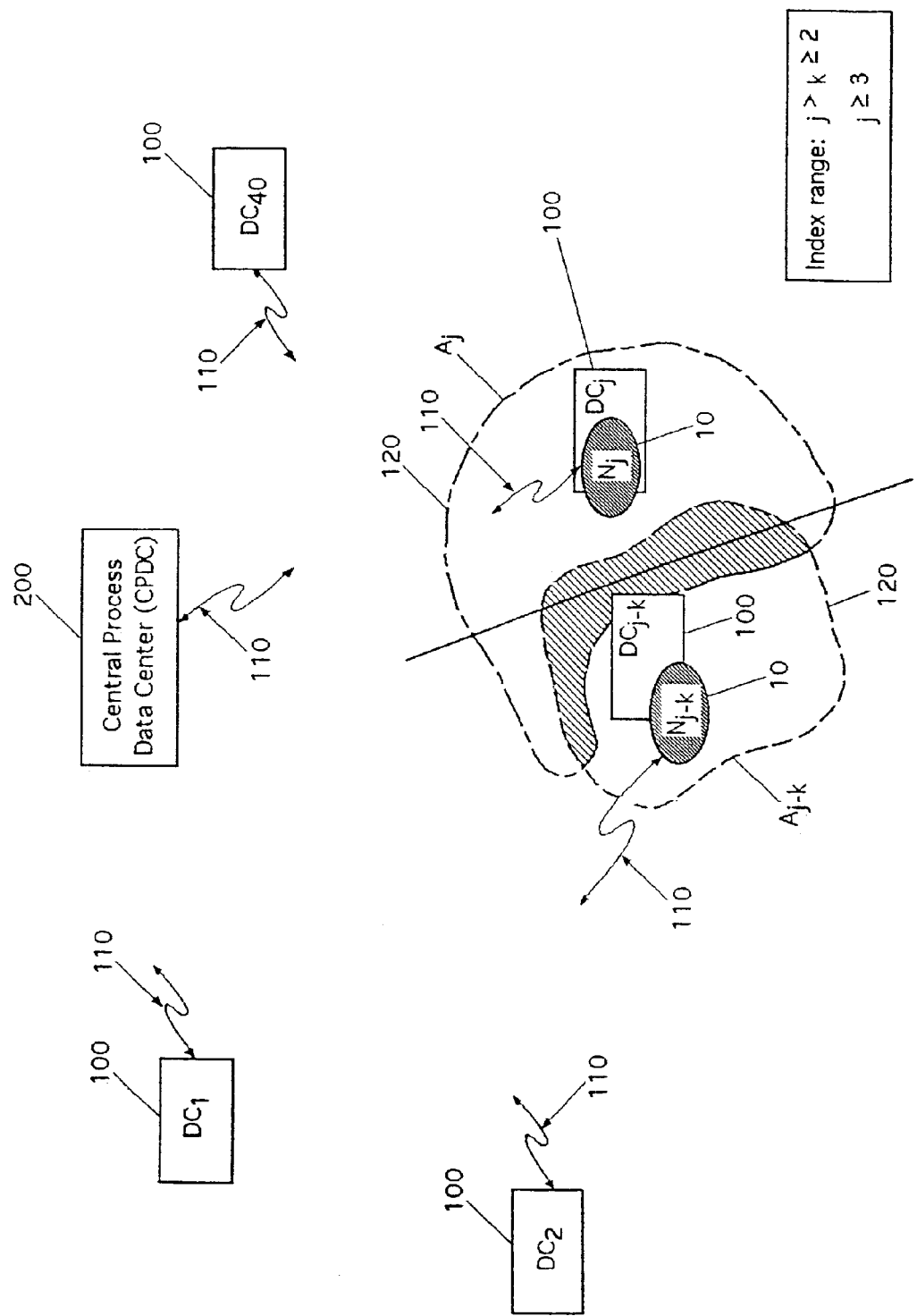
FIG. 3 is a schematic representation of the data network employed in the invention.

FIG. 3 represents the network comprised of data centers (DC) 100 collocated with the physical process nodes described in FIG. 1 linked via communications channels to the central process data center ("CPDC") 200 which as an aggregate provide the information regarding item processing operations so as to optimize the item processing. Data Center 1, Data Center 2 through Data Center J all communicate via data channels 110 with central process data center 200. Data content includes item volume data elements arranged in accordance with the physical network processing schemes for national distribution. Hence, a file exists containing all national volumes processed by a Data Center 100 for distribution to the other data centers. Since each data center is preferably coincident with a physical processing center (for example, data center j will report to CPDC 200 via channel 110) the item volumes sorted to other data centers J-1. This "J" file will comprise, at a minimum, J-1 subfiles containing the data center name and the volume sorted to each of J-1 data centers.

Remaining (non-national) volumes sorted by physical processing center Nj are for local distribution to the local area Aj 120. Distribution of volumes within Aj 120 is also reported via channel 110 to the central process data center 200. Since the CPDC 200 will have J files for all volumes sorted by the processing centers at the national level, it integrates files from J-1 data centers 100 containing volumes sorted for destination Nj 100 into a single file which it transmits back to data center j 100 located at processing center Nj. Using algorithms to estimate time of shipments arrival at Nj 100, the national distribution volumes for processing center node Nj is translated into a time sequenced processing backlog for processing center Nj. The CPDC 200 has several modes depending on the level of sophistication desired in optimizing the network processing efficiency. The desired mode is that which can, as a practical matter, be implemented and managed by the physical process network. These modes are described as follows starting with the lowest level of sophistication.

Mode 1 creates item processing backlog projections for each processing node as a function of data received from the nodes. Mode 2 includes a process to determine relative levels of volumes processed or to be processed by each node as determined by Mode 1, and makes adjustments so as to distribute more evenly workload among the nodes. If we assume, for example, that processing nodes 1 and 2 are physically adjacent, then surplus node 1 national or local distribution workload could be shifted from node 1 to node 2 with the effect of evening out the workload. Such a decision effectively diverts some item volumes to node 2. In the mode 2 realm, this means that CPDC 200 adjusts the files created in mode 1 to redistribute volumes among the nodes, so as to achieve load leveling. Mode 2 would include an option to gain concurrence by affected nodes before redistribution occurs. Having completed the redistribution, the CPDC 200 issues instructions to the processing nodes affected, resulting in a redirection of volumes from those nodes. It should be noted that load leveling does not mean processing equal volumes, rather it means adjusting node processing backlogs commensurate with the processing capacity of each node.

Mode 3 adds a decision process which considers federal processing center locations. Mode 3 algorithms make network processing backlog allocations to nodes as a function of known temporary or chronic differences in performance capacity and service quality of destinating P&DCs which serve as entry points for various private sector processing center nodes. Mode 4 adds a decision process by which the CPDC allocates volumes which destinate in overlapping delivery point areas which may exist between nodes Nj and Nj-k as shown according to which of two or more nodes have the greater processing capability on a given day or in a given timeframe. This process is similar to Mode 2, except that in this case the allocation decision, with node concurrence, would aim at improving service performance or efficiency or allow nodes to provide backup for each other. Mode 5 is a network restructuring mode in which one or more process center node is taken out of service, either for national distribution or local distributions or both. In this event, the CPDC 200 adjusts the allocation of originating or destinating items to the closest operational node, and, in effect, creates a new network on a temporary or permanent basis. Under this process mode, it is also possible to have a processing center handle only local (turnaround) delivery items, and inbound items for local delivery, and/or national (outbound) items, for the first time. Such a modifiable process has not been previously known for physical network processing systems and makes possible disaster recovery and optimization levels, with the new network level enterprise having modes which approach self-organizing properties.

The central process data center 200 also has the capability to provide volume data to the transportation provider, either a contractor or an internal network transportation partner. The volumes processed at the originating points are translated into shipping requirements which can be used to adjust transportation resources on a statistical, historical, or, in some cases, on a near-real-time basis. Given appropriate agreements with the federal postal service, transportation resources may be shared between the postal service and the private network, since volumes transported to the destinating end nodes would necessarily reduce volumes transported by postal service or its transportation contractors between P&DCs.

Mode 6 is an emulator mode in which one or more nodes emulate all or part of the final sort functions of a nearby P&DC. The node operating in mode 6, assuming sufficiently large processing capacity, provides finer depth of sort than is required to obtain presort discounts. Hence, perhaps under contract with the federal post, a node can supplement all or part of the local P&DC sort function in the event of P&DC failure due to natural disaster, strikes or partial impairment of equipment. Cooperative agreements with the federal post and extended processing times are inherent to this process mode. Mode 6 algorithms adjust network volumes and corresponding data flow to network nodes and process centers 100 to accommodate P&DC emulation at a given node(s). Mode 6 utility is limited by physical node processing capabity, process time available and terms of negotiated backup mode service agreements with the federal post. Obviously, only larger processing nodes are capable of using mode 6 to emulate all or part of a P&DC role.

(III) Financial Network Clearing System Process.

Figure 4:
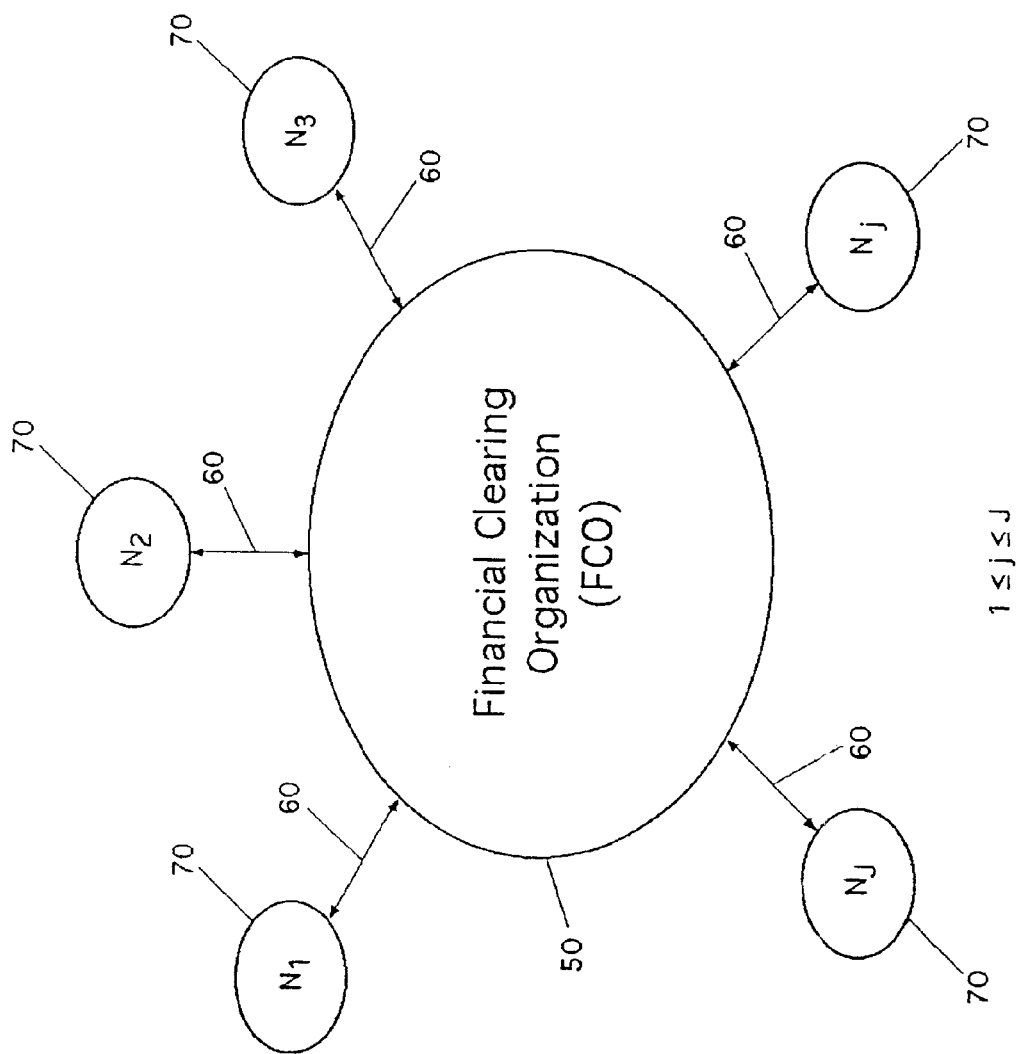
FIG. 4 is a schematic representation of the financial process operation of the invention.

The financial clearing system of the invention makes possible transfer of balances by the cooperating bureaus or presorters who 1) perform different amounts of sorting and/or bar coding or value added services, 2) process mail at different volume levels, and 3) perform processing with a variety of automation levels or work productivity. These differences and others mean that a bureau in the cooperating network will be performing different amounts of work from other nodes in the network. Financially, this means that a system must provide compensation to bureaus performing larger work content in the processing network for the additional service value created and, in general, compensating bureaus performing less work at a lower level. The financial process contemplated makes possible payment transfers to compensate for these differences without unduly burdening each cooperating business. FIG. 4 more fully describes the financial process and its relationship to the physical processing network, To accomplish this objective, the financial organization using the financial process described here operates in the interest of the cooperating parties and carries out its function so as to encourage participation in network process optimization; reward network units which perform the greatest amount of work properly; encourage consistency and service performance improvements; maximize profits while maintaining high service levels or standards; provide cooperating network members a competitive advantage over non-network presort operations which operate in various regional markets; and increase (indirectly) the competitive position of postal services versus other media for advertising and other communications. In performing the financial clearing function, the clearinghouse organization processes data inputs from each node. These data inputs include originating volumes processed at each node, primary sort volumes and volumes sorted to other nodes including such data as weight of a shipment or number of standard containers such as trays forwarded from each node to the other nodes, destinating volumes sorted by each node, and data files from each node identifying mail sorted to 3-digit, 5-digit, etc., level on a daily basis. These data enable the financial clearing process to determine the value of work performed by each node to a mutually agreed standard as a basis for evaluating the amount of value created at each node by the sorting and coding process.

Data regarding the cost of origin to destination transportation between nodes should also be generated. A significant amount of service improvement will occur from providing transportation for network volumes processed by the nodes. It is anticipated that future rate classification changes will provide incentives for performing such transportation service, perhaps as part of a privitization of the federal post. In that event, the financial process clearing function may also compensate bureaus for balancing payments in connection with the transportation services.

In order to illustrate the payment balancing process, it is assumed that payment balances are related to differences in volumes processed at destinating levels at the nodes, i.e., work done for other network members, excluding primary sorting done for each node's own customers for local distribution. Let $V_{Dj}$ destinating volume processed at node j. If:

$$V_{Dj} = \left(\sum_{i=1}^{J} V_{Di}\right)/(J-1),$$

where i=1 . . . J, i≠j then no destinating balancing payments are due because the destinating volume processed at node j is the network average determined by summing all of the destinating volumes processed at the other nodes and dividing by the number of other nodes. As an alternative to the foregoing, the volume at each node could be compared to a straight numerical average including node j as well as all other nodes in the summation and then dividing by J, not J-1. In the usual case, differences in volumes processed and work content will exist. Thus, the primary balance payment due node j is equal to a constant $K_D$ determined by agreement (a destinating sort payment premium) times he difference between $V_{Dj}$ and the average of the destinating volumes sorted at the other nodes. The balance payment $B_{Dj}$, is the balance due node j from or payable to the other nodes in the universe of J cooperating nodes.

For example, assume that K is $1 per 1,000 pieces processed. Five network members process a total of 120,000, 110,000, 100,000, 90,000 and 80,000 pieces received from other nodes during a period of time, respectively. The simple numerical average of the volumes is 100,000. The payment schedule is therefore:

| Processing Center | Amount |
|---|---|
| 1 | $20 |
| 2 | $10 |
| 3 | $0 |
| 4 | $-10 |
| 5 | $-20 |

Using the formula above, however, the payment amounts would be:

| Processing Center | Amount |
|---|---|
| 1 | $25 |
| 2 | $12.5 |
| 3 | $0 |
| 4 | $-12.5 |
| 5 | $-25 |

In fact, balance payments will be calculated as a function of not only volume differences, but also as a function of depth of sort, number of pieces barcoded, address corrections made, timely entry into the destination(s) postal centers, and the like.

The following example looks at a more complicated case wherein balancing payments are calculated based on differences in postage savings between nodes. Assume a network of three nodes. Node 1 handles 100,000 pieces per unit time for local distribution (primary sort, no help from other nodes), receives 10,000 pieces per unit time from nodes 2 and 3, and sends 50,000 pieces per unit time to nodes 2 and 3, for a total local workload of 110,000. Node 2 handles 50,000 pieces per a unit time for local distribution, receives 50,000 pieces per unit time from nodes 1 and 3, and sends 10,000 pieces per unit time to nodes 1 and 3, for a total local workload of 100,000. Node 3 handles 10,000 pieces per unit time for local distribution, receives 25,000 pieces per unit time from nodes 1 and 2, and sends 25,000 pieces per unit time to nodes 1 and 2, for a total local workload 35,000. Based on destinating processing costs and services alone, node 1 pays the network for its net export of 40,000 pieces, node 2 receives payment from the network for its net imports of 40,000 pieces, and node 3 breaks even because its imports and exports are equal.

However, due to economies of scale, the postage cost per imported piece varied at each node. Nodes 1 and 2 handling larger volumes were able to obtain greater discounts. Thus, node 1 paid on average 27 cents per piece on the 10,000 it received from nodes 2 and 3. Node 2 paid 28 cents per piece on the 50,000 it received, and node 3 paid 31 cents per piece on the 25,000 it received. The network total was (27*10,000)+(28*50,000)+(31*25,000)=2,445,000, an average about 28.76 cents per piece.

This should be compared to what the nodes would have paid in postage if no internode transfers had taken place, assuming more postage overall because fewer favorable groupings can be formed. Assume node 1 would have paid 31 cents per piece on the 50,000 it sent, node 2 would have paid 33 cents apiece on the 10,000 it sent, and node 3 would have paid 32 cents apiece on the 25,000 it sent. The no-network total was (30*50,000)+(33*10,000)+(32*25,000)=2,680,000, about 31.53 cents per piece. Total network postage savings based on this measure were 2.680 mil.–2.445 mil.=235,000.

Considering only postage, node 1 benefited from the network because it sent 30,000 to node 2 and 20,000 to node 3 for total postage=(30,000*28)+(20,000*31)=1,460,000. Doing the same mailing on its own would have cost 50,000*31=1,550,000, for a net saving savings of 90,000. Node 2 benefited because it sent 5,000 to node 1 and 5,000 to node 3 for total postage=(5,000*27)+(5,000*31)=290,000. Doing the same mailing on its own would have cost 10,000*33=330,000, for a net savings of 40,000. Node 3 benefited because it sent 5,000 to node 1 and 20,000 to node 2, total postage=(5,000*27)+(20,000*28)=695,000. Doing the same mailing on its own would have cost 25,000*32=800,000, so net savings were 105,000.

The 235,000 savings must now be divided among the nodes. The basis for such division must be agreed upon by each member of the network, and the allocation system for such balancing payments may have to sacrifice exacting fairness for simplicity and practicality. One approach is to focus on how much dollar value each node contributed to the total postage. Node 1 for 10,000 pieces accounted for 270,000/2,445,000=0.11, node 2 for 50,000 pieces accounted for 1,400,000/2,445,000=0.57, and node 3 for 25,000 pieces accounted for 775,000/2,445,000=0.32. If total savings of 235,000 are divided by these proportions, then 11%=25,850, 57%=133,950 and 32%=75,200. These amounts could be used as is, or a further adjustment could be made based on the amount each node actually saved in comparison to what it would have paid the federal post absent the network. For node 1, 25,850–90,000=–64,150. For node 2, 133,950–40,000=93,950. For node 3, 75,200–105,000=–29,800. The result is that node 1 pays node 2 the amount of 64,150, and node 3 pays node 2 the amount of 29,800.

Another approach that could be used focuses on the actual savings each node created and subtracts from that the amount each node actually saved by using the network. Node 1 did 10,000 pieces at 27 cents, versus 5,000 for node 2 at 33 cents and 5,000 for node 3 at 32 cents: (165,000+160,000)–270,000=55,000. Node 2 did 50,000 pieces at 28 cents, versus 30,000 node 1 at 31 cents and 20,000 for node 3 at 32 cents: (930,000+640,00)–1,400,000=170,000. Node 3 did 25,000 pieces at 31 cents, versus 5,000 for node 2 at 33 cents and 20,000 for node 1 at 31 cents: (165,000+620,000)–775,000=10,000. If these amounts are adjusted by the amount each node actually saved: for node 1, 55,000–90,000=–35,000, for node 2, 170,000–40,000=130,000, and for node 3, 10,000–105,000=–95,000. Node 2 is paid 35,000 by node 1 and 95,000 by node 3 as balancing payments. Node 3 is in a poorer position because this method of division takes into account both what each node gained from the others and what each node gave to the others in terms of savings. However, since this allocation system depends on knowing what would have happened in the absence of the network and such data may be difficult to generate, it may not prove practical to divide the savings in such a manner.

It is understood that multidimensional optimization algorithms, such as dynamic programming, as are common to the operations research branch of mathematics will be used to connect compensation of individual network members to value created by them. Balance payment premiums are ultimately based on the sum of labor performed, costs incurred and savings obtained by each network member as agreed between network members. More specifically, a network value is established for 1) introducing a mail piece into the system, 2) transporting the mail piece, 3) coding the mail piece, as with a bar code or other code then in use, 4) sorting the mail piece at various levels, and 5) entering the mail piece into the federal post with corresponding paperwork. The values established are, by mutual agreement, the value each member is satisfied to pay or receive for performing or contracting the work connected to that value. Clearly the market value or revenue received for introducing a mail piece may be higher in some regional markets than in others. These revenue differences, positive or negative, belong to the network entity (member) which generates them. The agreed network values are something apart and exist for purposes of calculating balance payments for adjustments necessary due to differences in workload between the nodes which result from optimization processes in the network that lower overall processing costs. Payment premium $K_D$ above is an example of a network value used to calculate balance payments. Separate premiums will exist for hybrid mail.

Referring to FIG. 4 the Financial Clearing Organization (FCO) 50 communicates with each process network member 70. Process members 70 are simply identified for purposes of this discussion as nodes $N_1 \ldots, N_j \ldots, N_j$. Data links 60 provide for communication of processing parameters from the various nodes 70 to the FCO 50 as described earlier. The FCO 50 determines whether balance payments are due, computes the balance payments, and issues a report to the processing nodes 70 supporting the balance payment adjustments. The basis for the financial relationship is memorialized in an agreement between the cooperating business entities as a condition of participation in the network for sorting and distribution. At the processing node level, differences in processing workloads and depth of sorts between nodes underlie the balance payment calculation. To obtain higher process efficiencies, the cooperating nodes forward mail to other nodes for sorting at the destinating end, and in turn receive mail from other nodes for processing when they represent the destinating end. FCO 50's function is to provide a balance payment compensation to nodes performing more work to achieve an overall higher network efficiency, resulting in higher profits than are possible in present non-network presort processing.

Financial mechanisms such as escrow accounts may be used by the FCO 50 to provide immediate payment to entities 70, which should receive positive balance payments based on extra work performed under the optimized network process system. Negative balance payments will be recorded from the escrow accounts of the node 70 units performing less value added work under the network agreement. Escrow account adjustments will be made by transfers from nodes 70 or their financial/banking representatives. Existing funds transfer practices, including electronic funds transfers between the parties, is also feasible. The FCO will be compensated by a fee structure, which includes a base payment amount and a component related to transaction volumes and frequency.

The various means for performing the functions of the information and financial systems according to the invention will generally comprise suitable software or hardware such as ROM routines capable of performing the recited function. While the invention has been described in reference to illustrative embodiments, this description is not intended to be construed in a limiting sense. Various rearrangements of elements, modifications and combinations of the illustrative embodiments, as well as other embodiments of the invention, will be apparent to persons skilled in the art upon reference to the description.

The invention claimed is:

1. A process for allocation of cost savings for members of a network of mail processing centers each having an associated set of one or more destination codes for which it receives mail addressed to destinations associated with such codes from other processing centers in the network, which network generates a net savings in processing costs by transferring mail between network processing centers prior to delivery to a final destination, comprising
    (a) determining a value of labor performed by each network processing center in processing of mail received from or sent to each of the other network processing centers;
    (b) determining a value of costs incurred by each network processing center in processing of mail received from or sent to each of the other network processing centers, which costs include destination-based sorting of such mail and transportation costs for transporting mail from one processing center to another;
    (c) inputting to a computer data comprising values determined in (a) and (b) and
    (d) using the computer to determine a value of cost savings generated by each network processing center by calculating a sum of labor performed and costs incurred for each processing center in the processing of mail, determining what costs each processing center incurred and what labor it performed on behalf of other processing centers, and determining what costs other processing centers incurred and what labor other processing centers performed on behalf of it.

2. The process of claim 1, further comprising making changes in mail distribution workload among the processing centers with the effect of evening out mail processing workload between processing centers.

3. The process of claim 1, wherein the data inputs include originating volumes of mail processed at each processing center, primary mail sort volumes, mail volumes sorted to other processing centers, data reflecting weight of a shipment or number of standard containers such as trays forwarded from each center to the other centers, destinating volumes sorted by each center, and data files from each center identifying mail sorted to 3-digit and 5-digit levels.

4. The process of claim 1, wherein the data inputs include originating volumes of mail processed at each processing center.

5. The process of claim 1, wherein the data inputs include primary mail sort volumes.

6. The process of claim 1, wherein the data inputs include mail volumes sorted to other processing centers.

7. The process of claim 1, wherein the data inputs include data reflecting weight of a shipment or number of standard containers such as trays forwarded from each processing center to other processing centers.

8. The process of claim 1, wherein the data inputs include destinating volumes sorted by each center.

9. The process of claim 1, wherein the data inputs include data files from each center identifying mail sorted to 3-digit and 5-digit levels.

10. The process of claim 1, further comprising making changes in mail distribution workload among the processing centers with the effect of evening out the workload between processing centers.

11. The process of claim 1, further comprising and making balancing payments between entities controlling the network processing centers based on the values determined in (a), (b) and (c).

12. The method of claim 1, wherein the value of cost savings generated is determined by comparing an actual cost to a benchmark cost and wherein the benchmark cost is an estimated cost calculated based upon an assumption that the network did not exist.

13. The method of claim 12, wherein a financial clearinghouse entity receives deposit payments from entities controlling the network processing centers and makes the balancing payments of step (d) by making transfers between deposit accounts.

14. The method of claim 1, wherein step (c) includes calculating savings on postage.

* * * * *